United States Patent [19]

Seabold et al.

[11] 4,341,585
[45] Jul. 27, 1982

[54] DEVICES FOR IMPARTING CURL TO TAPES

[75] Inventors: Thomas W. Seabold, Saint Paul; Richard A. Patterson, Woodbury; Richard P. de Neui, Lake Elmo, all of Minn.

[73] Assignee: Minnesota Mining and Manufacturing Company, St. Paul, Minn.

[21] Appl. No.: 188,672

[22] Filed: Sep. 19, 1980

Related U.S. Application Data

[63] Continuation-in-part of Ser. No. 121,716, Feb. 15, 1980, abandoned.

[51] Int. Cl.³ .............................................. B65H 17/28
[52] U.S. Cl. ..................................... 156/443; 156/461; 156/196; 226/96
[58] Field of Search ............... 156/344, 196, 584, 209, 156/220, 221, 443, 461; 226/96; 221/73

[56] References Cited

U.S. PATENT DOCUMENTS

| | | | |
|---|---|---|---|
| 2,684,240 | 7/1954 | Lindsey | 226/96 |
| 2,769,633 | 11/1956 | Krueger | 226/96 |
| 3,308,750 | 3/1967 | Voegelin | 101/126 |
| 3,472,724 | 10/1969 | Casey | 156/521 |

Primary Examiner—David A. Simmons
Attorney, Agent, or Firm—Cruzan Alexander; Donald M. Sell; William L. Huebsch

[57] ABSTRACT

Devices for deforming tape backings and which thereby impart a curl to adhesive tapes are described. One type of device comprises means whereby a tape backing is deformed as the tape is bent back upon itself at an angle as it detaches from a roller to which it has been adhered. An alternative type of device comprises means whereby a tape backing is deformed as the tape is deformed into grooves on a fluted roller.

12 Claims, 6 Drawing Figures

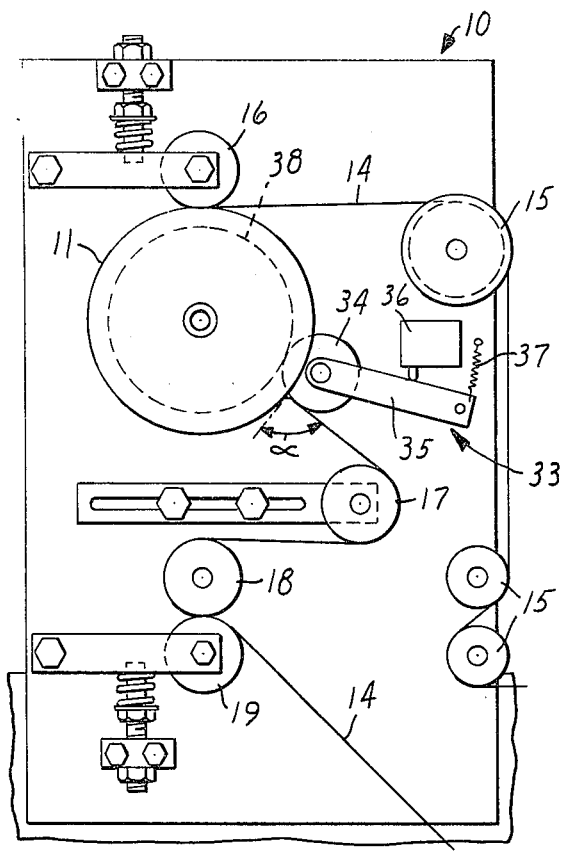
Fig. 1
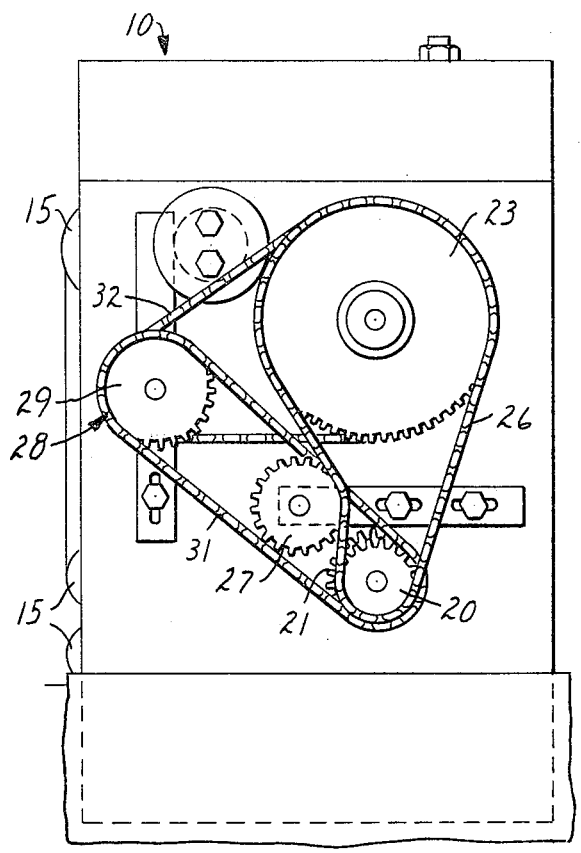
Fig. 2
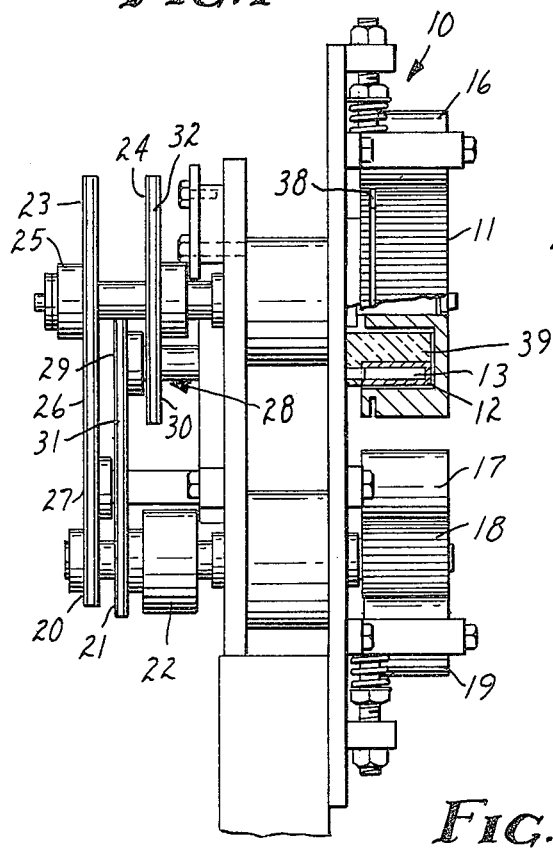
Fig. 3
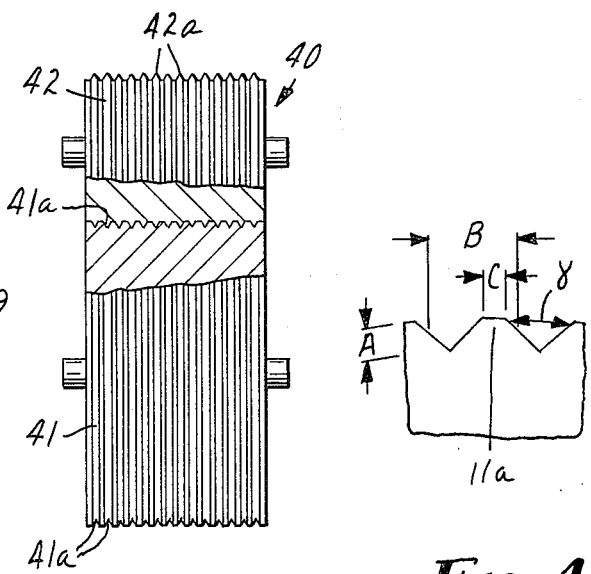
Fig. 5
Fig. 4

DEVICES FOR IMPARTING CURL TO TAPES

CROSS-REFERENCE TO RELATED APPLICATIONS

This application is a continuation-in-part of our copending application Ser. No. 121,716, filed Feb. 15, 1980, now abandoned.

BACKGROUND OF THE INVENTION

This invention relates to devices useful for imparting curl to tapes.

One difficulty often encountered in applying a flat length of tape to flat objects is that air can be entrapped between the tape and the flat smooth surface to which it is applied. Air entrapment is often undesirable since it can ultimately result in a non-uniform bond between the tape and the surface.

Entrapment of air as described above occasionally occurs when applying a length of flat tape comprising a particularly aggressive, pressure sensitive adhesive layer and is even more likely to occur in the event that the aggressive adhesive layer has an exposed surface which is free of surface irregularities and is glassy in nature. More particularly, a length of flat tape comprising an aggressive pressure sensitive adhesive layer will tend to adhere almost instantaneously over its entire length to a flat surface to which it is being applied once the tape is brought into contact with that surface. The consequence of this instantaneous adherence can be the undesirable of this instantaneous adherence can be the undesirable entrapment of air. In the event that the exposed surface of the adhesive layer is glassy, and once air has been entrapped, the air cannot escape even upon application of an external flattening force. This is in contrast to the situation in which surface irregularities exhibited by adhesive layers comprising tapes of other constructions (e.g. linered tapes) permit entrapped air to escape, particularly upon the application of a flattening force.

One commercial situation in which employment of flat, pressure sensitive tape may lead to an unsatisfactory product unless used on a liner is in the sealing of preformed openings in container ends with predetermined lengths of tape. Here it is highly desirable that no air be entrapped between the tape and the container end since, particularly upon exposure to elevated temperatures, entrapped air can lead to localized detachment of the tape and can ultimately result in contamination of the container's contents through exposure to the external environment or in corrosion of the top of the container end.

Conventional tape applying machines, such as those described in U.S. Pat. Nos. 2,684,240 (Lindsey), 2,990,081 (deNeui), 3,472,724 (Casey), 3,750,511 (Toensing) and copending application Ser. No. 041,629, filed May 23, 1979 and commonly assigned, typically require the use of linered tape when tape is applied to container ends. Linered tapes comprise tapes having a slightly irregular or rough surface on an aggressive pressure-sensitive adhesive layer which is covered with a release liner. The adhesive layer can be applied with these machines to container ends without significant entrapment of air. Linerless tapes which typically comprise glassy, aggressive pressure-sensitive adhesive layers and which are more economical than linered tapes are not generally compatible with applicating machines of the above type since air entrapment between the adhesive layer and the container end will likely occur.

Although curl may be imparted to strip materials such as tape by passing such materials over a sharp edge, such a curling means generally requires that the material be pulled over the sharp edge with great force and rapidity, conditions which many tape backings could not survive. In addition, the degree of curl imparted to a strip of material by such a curling means would typically be nonuniform over the length of the tape.

SUMMARY OF THE PRESENT INVENTION

The present invention provides devices useful for imparting a uniform curl to a pressure-sensitive adhesive tape by means of deforming the backing of the tape without destroying the tape backing or any coating overlaying that backing. In a preferred device, curl results from producing areas of uniformly spaced, localized deformations of the backing as the tape is bent back upon itself upon removal from a surface comprising similarly spaced, raised portions to which the tape has been adhered. The devices of the present invention can provide tapes having a variety of degrees of curl.

A curled tape obtained using the devices of the present invention can be advantageously applied to surfaces without concomitant entrapment of air even in the event that the tape comprises a glassy, aggressive pressure-sensitive adhesive layer.

Curled tapes which are obtained using the devices of the present invention are particularly suitable for sealing preformed openings in container ends without occurrence of the undesired entrapment of air between the tape and the container end.

The curling devices of the present invention may be used to produce curled tape which can be wound on rolls for later use in conventional tape applying machines, such as those described in U.S. Pat. Nos. 2,990,081 (deNeui), 3,750,511 (Toensing) and said copending application Ser. No. 041,629, provided that those machines are equipped with the vacuum wheels described in copending application Ser. No. 121,715, filed Feb. 15, 1980 and commonly assigned, incorporated herein by reference, or in the tape applying machines described in U.S. Pat. Nos. 2,684,240 (Lindsey) and 3,472,724 (Casey). Alternatively, the curling devices of the present invention can be conveniently mounted onto those tape applying machines so as to provide curled tape which is then immediately applied to objects.

BRIEF DESCRIPTION OF THE DRAWING

The invention will be further described with reference to the accompanying drawings wherein like numbers refer to like parts in the several views, and wherein:

FIG. 1 is a front view of one embodiment of a curling device in accordance with the present invention.

FIG. 2 is a rear view of the embodiment illustrated in FIG. 1.

FIG. 3 is a side view of a portion of the embodiment illustrated in FIG. 1.

FIG. 4 is a partial face view of a fluted roller for use in the devices of the present invention.

FIG. 5 is a face view of an alternative embodiment of a curling device in accordance with the present invention.

DESCRIPTION OF THE PREFERRED EMBODIMENT

Figure 6:
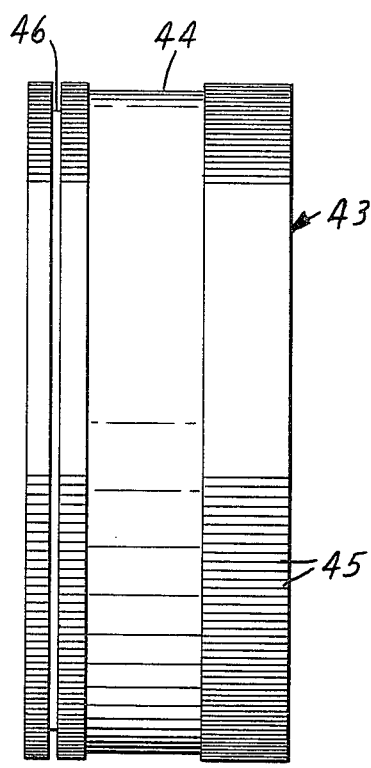
FIG. 6 is a side view of an alternative fluted roller for use in the devices of the present invention.

Referring now to the drawings, there is illustrated a device according to the present invention for curling tape, which device is generally designated by the reference number 10.

As is seen in FIGS. 1-3, device 10 includes roller 11 and a non-rotating heated internal ring 12 containing heating elements 13 and insulation 39. Heat from the internal ring 12 radiates to the inside surface of roller 11 and maintains roller 11 at a preset elevated temperature. Tape 14 is supplied to roller 11 by means of passage over a series of rollers 15 and is adhesively secured to roller 11 by means of press roller 16. In the preferred embodiment, roller 11 is a fluted roller having equally spaced surface elevations 11a on the peripheral surface parallel to the axis of rotation of the roller. Employment of such a fluted roller as roller 11 is preferred since it will result in a series of equally spaced areas of localized deformation of the tape backing caused as the tape is pulled back upon itself at an angle (hereinafter the control angle designated as $\alpha$ in FIG. 1) as it disengages from the elevated surfaces 11a on the fluted roller 11. The force required to remove the tape from the fluted roller surface, when that force is applied at an angle $\alpha$, overstresses the backing in the areas where the adhesive is attached to the roller and produces a series of deformations in the tape. These individual closely spaced deformations collectively produce the desired uniform transverse curl over the length of the tape. Heating elements 13, while optional, are preferred in order to promote adhesion of tape 14 to roller 11, and to thereby assure substantial deformation of the tape backing once the tape is bent back upon itself as it detaches from roller 11. It is also preferred that roller 11 be of such a diameter (i.e., about 3 inches or more) which allows enough time to produce secure attachment of the adhesive of the tape to roller 11 prior to the point at which the tape detaches from the roller.

An alternative device in accordance with the present invention comprises means (e.g. a heat lamp) by which the tape, prior to attachment to the roller 11, is heated in order to promote adhesion of the tape to the roller 11. Heating elements 13 would then not be required.

Fluted rollers having any number of surface elevations 11a on their peripheral surfaces may be used in the devices disclosed herein and are within the scope of the invention. However, if a tape having a uniform continuous curl is desired, preferred fluted rollers will have a plurality of surface elevations such that a plurality of deformations of the tape backing will result over a given length of the tape. At the same time, if a uniform curl is desired in a tape, those surface elevations preferably should not be so numerous that the fluted roller is in effect functioning as a smooth-surfaced roller since that type of roller is less apt to provide for a uniform curl.

Additionally, it should be noted at this point that the degree of curl imparted to a tape depends in part upon the spacing of the deformations of the tape backing. The more numerous those deformations, and the smaller the distance between them, the greater is the degree of curl which will result in a tape.

A preferred fluted roller is illustrated in FIG. 4. That roller has a diameter of about 6 inches (15.2 cm) and has about 540 surface elevations 11a formed as the result of the presence of equally spaced, vee-shaped grooves located on the peripheral surface of the roller. The magnitude of the angle at the apex of the groove is about 90°, that angle being designated as $\gamma$ in FIG. 4. The grooves have a depth of about 0.013 inch (0.033 cm), that depth being designated by letter "A" in FIG. 4. The circular pitch, designated letter "B" in FIG. 4, is about 0.034 inch (0.086 cm) and the land between two adjacent grooves is about 0.008 inch (0.020 cm) across, as is designated by letter "C".

FIG. 6 illustrates another preferred fluted roller 43 for employment in the device of FIGS. 1, 2 and 3. That roller is identical to the fluted roller illustrated in FIG. 4 except that the roller of FIG. 6 has a groove 44 on its peripheral surface. The base of this groove is below the level of the surface elevations 45 in the roller 43, thus making the surface elevations 45 discontinuous. The advantage of this type of fluted roller is that it will provide transversely curled tape which does not have localized areas of deformation extending across the entire width of the tape. It has been found in the present invention that tape which has been vapor coated in order to improve its impermeability (e.g., to air and moisture) may have a lessened impermeability once it is curled, perhaps as the result of fracturing of the vapor coating along the lines of deformation. Thus by employing a fluted roller of the type illustrated in FIG. 6, curled tape is provided which can be used, for example, to seal openings in containers without having the lines of deformation extend into the area of the openings. The width of band 44 should be such that the lines of deformation of the tape will not extend into the area of the openings in the object being sealed with the tape. The function of slot 46 is discussed hereinbelow.

Other types of rollers for use as roller 11 are within the scope of this invention. For example, smooth-surface rollers or rollers having surfaces with various types of elevations in various patterns (e.g., herring bone, diagonal and curved elevations and discontinuous elevations other than the discontinuous pattern depicted in FIG. 6) may be used.

Upon detachment from roller 11, tape 14 passes to roller 17. The position of roller 17 is adjustable and functions to determine the magnitude of the control angle $\alpha$. The control angle in turn determines the degree that the tape backing is deformed and, as a result, determines the degree of curl which is ultimately imparted to tape 14.

From roller 17, tape 14 then passes to roller 18, which is preferably knurled, and press roller 19. Roller 11 and roller 18 are connected to one another by means of the transmission illustrated in FIGS. 2 and 3. It is by means of this transmission that the point of detachment of tape 14 from the peripheral surface of roller 11 is maintained within a predetermined narrow band on roller 11.

Referring now to FIGS. 2 and 3, it is seen that roller 18 is attached to two sprockets, sprockets 20 and 21, with sprocket 21 being the larger of the two. Electric clutch 22 is normally disengaged and permits roller 18 to drive only sprocket 20. Upon engagement of the electric clutch 22, roller 18 drives both sprocket 20 and sprocket 21. Similarly, roller 11 is attached to two sprockets, sprockets 23 and 24, which are of the same diameter. Further, sprocket 23 is attached to roller 11 by means of a one-way roller clutch 25. Sprockets 20 and 23 are connected to one another by means of chain 26 and an adjustable idler roller 27. In normal operation it is by means of sprockets 20 and 23 that roller 18, which is driven by passage of tape 14 through the device 10, drives roller 11.

In the alternative mode of operation, electric clutch 22 is engaged and sprocket 21 acts to drive adjustable idler sprocket assembly 28. Idler sprocket assembly 28 comprises sprockets 29 and 30 which are rigidly attached thereto. Sprocket 29 is attached to sprocket 21 by means of chain 31 and sprocket 30 being attached to sprocket 24 by means of chain 32. In this manner, since sprocket 21 is of a larger diameter than sprocket 20, roller 11 is caused to rotate at a slightly faster rate than if clutch 22 were not engaged. When this occurs, one way clutch 25 allows the shaft of roller 11 to rotate ahead of sprocket 23.

Referring back to FIG. 1, it is sensor 33 which detects the point at which tape 14 is detaching from roller 11 and which successively engages and disengages electric clutch 22. More particularly, sensor 33 comprises roller 34, arm 35, limit switch 36 and spring 37. By means of spring 37, roller 34 is caused to ride in a slot 38 (designated by the numeral "46" in FIG. 6) in the surface of roller 11 (best illustrated in FIG. 3) and changes its position relative to roller 11 in response to changes in the point of detachment of tape 14 from roller 11. Changes in the position of roller 34 ultimately turns limit switch 36 "on" or "off", which in turn results in engagement or disengagement of clutch 22, respectively.

Thus, when tape 14 is prematurely detaching from roller 11, sensor 33 acts to engage electric clutch 22 and thereby results in an increased rate of rotation of roller 11 with respect to roller 18. In effect, the detachment of tape 14 from roller 11 is thereby delayed. The increased rate of rotation of roller 11 with respect to roller 18 continues until sensor 33 detects that tape 14 is now detaching from roller 11 at a location beyond the desired point. Sensor 33 then acts to disengage clutch 22 such that roller 11 will return to its original rate of rotation with respect to roller 18. In this manner, a uniform transverse curl is imparted to a tape since the point of detachment of tape 14 from roller 11 and therefore the control angle, remain as constant as is possible.

With regard to the degree of curl actually imparted to a tape, the smaller the control angle $\alpha$, the greater the degree of curl which will result since the tape backing will be stressed to a greater extent. The degree of curl desired in a particular tape will, of course, depend upon the end-use contemplated for that tape.

Slot 38 of FIG. 4 or slot 46 of FIG. 6 may result in a tape having localized areas of deformation which are discontinuous as does groove 44 of FIG. 6.

An alternative curling device in accordance with the present invention is illustrated in FIG. 5 and is generally designated by the reference number 40 in that Figure. This particular curling device provides tape having lines of deformation essentially parallel to the length of the tape and which therefore exhibits a longitudinal curl (that is across its width).

Referring now to FIG. 5, it is seen that device 40 includes fluted rollers 41 and 42, with fluted roller 41 having equally spaced grooves 41a on its peripheral surface perpendicular to its axis of rotation. Similarly, fluted roller 42 has surface elevations 42a which are capable of meshing engagement with grooves 41a of fluted roller 41. Fluted rollers 41 and 42 are oriented so as to deform the tape (not illustrated) into the grooves 41a between the surface elevations on roller 41 as the tape passes between the two rollers. It is these areas of localized deformation of the tape backing which collectively result in curl being imparted to the tape.

In an alternative embodiment, roller 42 has a smooth peripheral surface and comprises resilient rubber which provides the means whereby the tape (not illustrated) is deformed into the grooves of roller 41.

Through employment of a fluted roller having equally spaced surface elevations parallel to its axis of rotation, a tape backing could be deformed into the grooves of the rollers and a tape exhibiting transverse curl would thereby result. Similarly, other types of rollers (e.g. those having herring bond, diagonal, curved and discontinuous elevations) may be used to impart various types of curl to tapes and are within the scope of this invention.

Curled tapes of the present invention can comprise the various materials which are well known in the art for tape backings, adhesives, primers and the like. Particularly suitable materials for tapes which are to be used as container closures are described in copending application Ser. No. 188,671, filed of even date and commonly assigned, incorporated herein by reference.

When transversely curled tapes obtained using devices of the present invention and particularly those obtained using devices similar to that illustrated in FIGS. 1, 2 and 3, are to be applied to container ends, it is preferred that the tape applying machines, such as those described in U.S. Pat. Nos. 2,990,081 (deNeui), 3,750,511 (Toensing) and said copending application Ser. No. 041,629, incorporated herein by reference, be equipped with vacuum wheels of the type disclosed in said copending application Ser. No. 121,715, incorporated herein by reference. These vacuum wheels are adapted to adhesively secure only a portion of a given tape segment to a container end and the remaining portion remains unadhered as the result of the tape's curl. After a curled tape segment has been applied to a container end by means of such a vacuum wheel, the remaining unadhered portions of the curled tape segment can then be flattened onto the container end in a manner which assures exclusion of air between the tape segment and the container end. Means for flattening curled tape segments onto container ends include the flattening devices described in said copending application Ser. No. 121,715, incorporated herein by reference.

It has been found that tapes having curls of from about one-half to about two inches (1.3 to 5.1 cm) in radius are most suitable for use with the preferred vacuum wheels and flattening devices described in said copending application Ser. No. 121,715. Tape segments exhibiting curl of greater than about two inches (5.1 cm) in radius will have a tendency to flatten out instantaneously onto a container end and entrap air when applied by means of a vacuum wheel. On the other hand, tape segments exhibiting curl of a radius of less than about one-half inch (1.3 cm) may render flattening of tape segments onto container ends difficult, if not virtually impossible. Furthermore, tapes exhibiting a curl of less than about one-half inch may have a tendency to snag in any recesses on the peripheral surface of the vacuum wheel and may be thrown clear of that surface as a result.

Curled tape exhibiting longitudinal curl may be conveniently applied to surfaces using tape applying machines of the type described in U.S. Pat. Nos. 2,684,240 (Lindsey) and 3,472,724 (Casey), incorporated herein by reference, provided that those machines have been modified so as to include means (e.g. a vee-shaped applying pad) whereby only a selected portion of a curled tape segment is adhered initially to the surface. Furthermore, means (e.g. a flattening device comprising a resilient vee-shaped pad which deforms as contact is made with the surface) should be provided which will permit the curled tape segment to then be completely flattened onto the surface with exclusion of air between the tape and the surface. The projecting wheel and tape crease wheel described in U.S. Pat. Nos. 2,684,240 (Lindsey) and 3,472,724 (Casey), respectively, preferably will have rounded grooves when used with the longitudinally curled tapes described herein.

Either transversely or longitudinally curled tapes can also be applied using conventional die-cutting machines which are well-known in the art, provided that those machines are modified in a manner analogous to that described in the preceeding paragraph (e.g. modified with respect to applying pads and flattening devices).

Curled tape produced using the curling devices of the present invention can be rewound for later employment in tape applying machines. When curled tape exhibiting transverse curl is to be stored for later use, it is preferred that that tape be rewound in rolls in a manner such that the adhesive layer of the tape is on the outside of roll. By winding transversely curled tape in this manner, the tape will retain its curl for a longer period of time and this is particularly important when the tape is stored at elevated temperatures at which the tape normally will have an increased tendency to lose its curl with time.

Alternatively, the curling devices of the present invention can be conveniently mounted onto tape applying machines such that curled tapes will be applied to container ends without the intermediate step of having to rewind the tape prior to use.

Other variants are possible within the scope of the present invention.

What is claimed is:

1. A device for curling tape comprising a backing and an adhesive layer, said device comprising a first roller having grooves on the peripheral surface of the roller and a second roller which provides means whereby said tape is deformed into said grooves to impart at least a temporary curl to said tape.

2. A device in accordance with claim 1 wherein said second roller has a peripheral surface having grooves thereon capable of meshing engagement with said first roller.

3. A device in accordance with claim 1 wherein said second roller has a smooth peripheral surface and comprises resilient rubber.

4. A device in accordance with claim 1 wherein said grooves of said first roller are perpendicular to the axis of rotation of said first roller.

5. A device for curling tape comprising a backing and an adhesive layer, said device comprising a roller having surface elevations on its peripheral surface parallel to the axis of rotation of said roller and having a groove on said peripheral surface which is free of said surface elevations, means for adhesively securing said tape to said peripheral surface of said roller, and means for detaching said tape from said first roller and for bending said tape back upon itself upon detachment from said roller at an angle to impart at least a temporary transverse curl to said tape.

6. A device in accordance with claim 5 wherein said surface elevations are equally spaced.

7. A device for curling tape comprising a backing and an adhesive layer, said device comprising a first roller having a generally cylindrical peripheral surface, securing means for adhesively securing said tape to said peripheral surface, detaching means for detaching said tape from said peripheral surface and for bending said tape back upon itself upon detachment at an angle to impart at least a temporary transverse curl to said tape, detecting means for detecting changes in said angle at which said tape is bent back, and maintaining means for maintaining substantially constant said angle at which said tape is bent back, said maintaining means comprising a second roller to which said tape passes upon detachment from said first roller and a variable transmission connecting said first roller and said second roller, said variable transmission acting to change the relative rates of rotation of said first roller and said second roller when said detecting means detects a change in said angle at which said tape detaches from said peripheral surface.

8. A device in accordance with claim 7 wherein the peripheral surface of said first roller is fluted.

9. A device in accordance with claim 7 wherein the peripheral surface of said first roller is smooth.

10. A device in accordance with claim 8 wherein said peripheral surface of said first roller has surface elevations parallel to the axis of rotation of said first roller.

11. A device in accordance with claim 10 wherein said first roller comprises a groove on said peripheral surface, said groove being free of said surface elevations.

12. A device in accordance with claim 10 wherein said surface elevations are equally spaced.

* * * * *